US008567471B1

(12) United States Patent
Regimbal

(10) Patent No.: US 8,567,471 B1
(45) Date of Patent: Oct. 29, 2013

(54) TIRE WORKING APPARATUS AND METHOD OF USE

(76) Inventor: Richard T Regimbal, Huron, SD (US)

( * ) Notice: Subject to any disclaimer, the term of this patent is extended or adjusted under 35 U.S.C. 154(b) by 222 days.

(21) Appl. No.: 12/792,091

(22) Filed: Jun. 2, 2010

(51) Int. Cl.
   *B60C 25/04* (2006.01)
(52) U.S. Cl.
   USPC .......................................................... 157/1.3
(58) Field of Classification Search
   USPC .................. 157/1.3, 1.1, 1.11, 1.17, 1.2–1.28
   See application file for complete search history.

(56) References Cited

U.S. PATENT DOCUMENTS

| 819,156 | A | | 5/1906 | Morrill |
| 834,908 | A | | 11/1906 | Hussey |
| 951,200 | A | | 3/1910 | Pillner |
| 965,858 | A | | 8/1910 | Bellew |
| 1,219,948 | A | * | 3/1917 | Kaehler .......................... 254/131 |
| 1,220,956 | A | | 3/1917 | Coffman |
| 1,234,141 | A | * | 7/1917 | De Vine ....................... 157/1.22 |
| 1,567,025 | A | | 4/1925 | Allison |
| 2,118,211 | A | | 1/1940 | Tilson |
| 2,399,145 | A | | 10/1943 | Schumann |
| 2,421,856 | A | | 6/1947 | Teegarden |
| 3,029,860 | A | | 2/1959 | Schultz et al. |
| 3,100,011 | A | | 8/1963 | Lydle |
| 3,717,192 | A | * | 2/1973 | Hoover et al. .................. 157/1.1 |
| 3,823,756 | A | * | 7/1974 | Rainey ............................. 157/1.3 |
| 4,403,640 | A | * | 9/1983 | Schifferly ....................... 157/1.3 |
| 4,436,134 | A | * | 3/1984 | Gaither ........................... 157/1.3 |
| 4,461,335 | A | * | 7/1984 | Beemer .......................... 157/1.22 |
| 4,527,607 | A | * | 7/1985 | Gaither ........................... 157/1.3 |
| 4,738,294 | A | * | 4/1988 | Fosse ............................. 157/1.22 |
| 4,846,239 | A | * | 7/1989 | Heller et al. .................... 157/1.3 |
| 5,086,674 | A | * | 2/1992 | Her ................................ 81/124.4 |
| 5,213,146 | A | * | 5/1993 | Onozawa ........................ 157/1.3 |
| 5,632,056 | A | * | 5/1997 | Hsiao ................................. 7/138 |
| 5,740,848 | A | * | 4/1998 | Goracy ........................... 157/1.3 |
| 6,527,033 | B1 | * | 3/2003 | Kliskey .......................... 157/1.3 |
| 6,684,927 | B1 | | 2/2004 | Kliskey |
| 7,861,760 | B2 | * | 1/2011 | Ochoa .......................... 157/1.45 |
| 7,866,365 | B2 | * | 1/2011 | Ochoa ............................. 157/1.3 |
| 7,882,882 | B2 | * | 2/2011 | Cunningham ............... 157/1.24 |

* cited by examiner

*Primary Examiner* — Hadi Shakeri
(74) *Attorney, Agent, or Firm* — Hagen, Wilka & Archer, LLP; Mark A. Ekse

(57) ABSTRACT

A Tire Working Apparatus and Method of Use for facilitating the mounting of a tractor tire onto a wheel while the wheel is in a vertical or mounted positioned. The tire working apparatus includes a tire iron for selectively working a bead of a tire adjacent to a rim flange of a wheel, a rotating member selectively receiving said tire iron, and a ratchet wrench. The rotating member further comprises a main cylindrical wall, which includes a lateral aperture positioned substantially perpendicular to a longitudinal axis of said rotating member and selectively receives the tire iron. The rotating member generally has a socket positioned at one end for receiving the square drive of the ratchet wrench.

5 Claims, 3 Drawing Sheets

TIRE WORKING APPARATUS AND METHOD OF USE

BACKGROUND OF THE INVENTION

1. Field of the Invention

The present invention relates to tire working tools and more particularly pertains to a new tire working apparatus and method of use for facilitating the mounting of a tractor tire onto a wheel while the wheel is in a vertical or mounted positioned.

2. Description of the Prior Art

The use of tire working tools is known in the prior art. More specifically, tire working tools heretofore devised and utilized are known to consist basically of familiar, expected and obvious structural configurations, notwithstanding the myriad of designs encompassed by the crowded prior art which have been developed for the fulfillment of countless objectives and requirements.

Various tire working tools are known in the prior art. Illustrative examples of such known devices include: U.S. Pat. No. 1,219,948; U.S. Pat. No. 1,220,956; U.S. Pat. No. 3,029,860; U.S. Pat. No. 819,156; U.S. Pat. No. 834,908; U.S. Pat. No. 951,200; U.S. Pat. No. 965,858; U.S. Pat. No. 1,567,025; U.S. Pat. No. 2,188,211; U.S. Pat. No. 2,399,145; U.S. Pat. No. 2,421,856; U.S. Pat. No. 3,100,011; U.S. Pat. No. 4,403,640; U.S. Pat. No. 4,527,607; and U.S. Pat. No. 6,684,927. While each of these devices have their own unique strengths and weaknesses, they do not address a need fulfilled by the current invention.

In these respects, the Tire Working Apparatus and Method of Use according to the present invention substantially departs from the conventional concepts and designs of the prior art, and in so doing provides an apparatus primarily developed for the purpose of facilitating the mounting of a tractor tire onto a wheel while the wheel is in a vertical or mounted positioned.

SUMMARY OF THE INVENTION

In view of the foregoing disadvantages inherent in the known types of tire working tools now present in the prior art, the present invention provides a new tire working apparatus construction wherein the same can be utilized for facilitating the mounting of a tractor tire onto a wheel while the wheel is in a vertical or mounted positioned.

To attain this, the present invention generally comprises a tire iron for selectively working a bead of a tire adjacent to a rim flange of a wheel, a rotating member selectively receiving said tire iron, and a ratchet wrench. The rotating member further comprises a main cylindrical wall, which includes a lateral aperture positioned substantially perpendicular to a longitudinal axis of said rotating member and selectively receives the tire iron. The rotating member generally has a socket positioned at one end for receiving the square drive of the ratchet wrench.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is that it allows a single user to repair and reinstall a tractor tire in the field, with the wheel still mounted to the tractor.

Yet another advantage of the present invention is the additional leverage provided by the ratchet wrench portion which provides the user with a significant mechanical advantage.

Still another advantage of the present invention is both the compact size of the invention, and the lack of any need for a power source such as electricity or hydraulics, which allows for improved portability.

Even still a further advantage of the present invention is that it allows the user to work tires in a vertical orientation, rather than horizontal.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
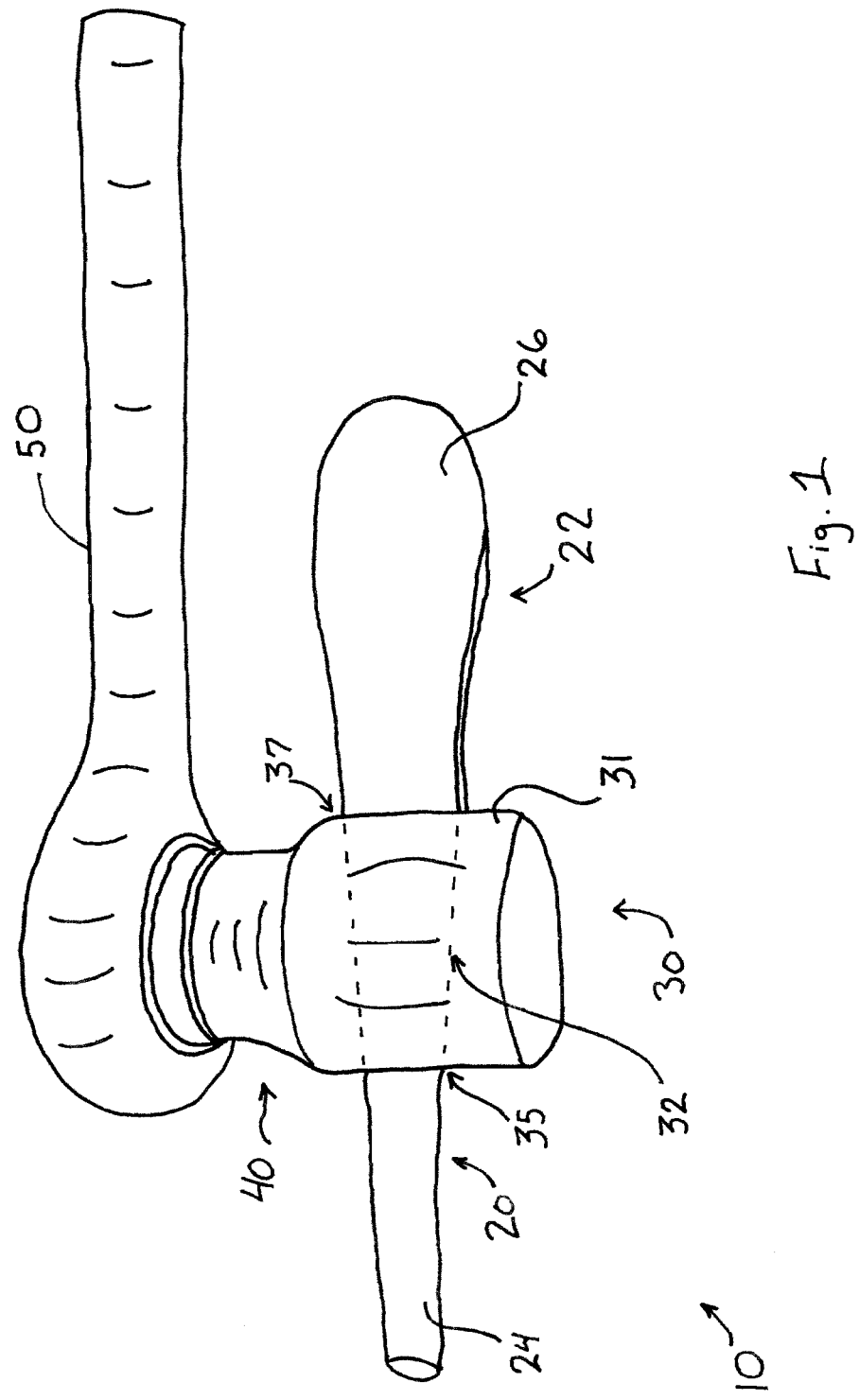
FIG. 1 is a schematic perspective view of a new Tire Working Apparatus according to the present invention.
Figure 2:
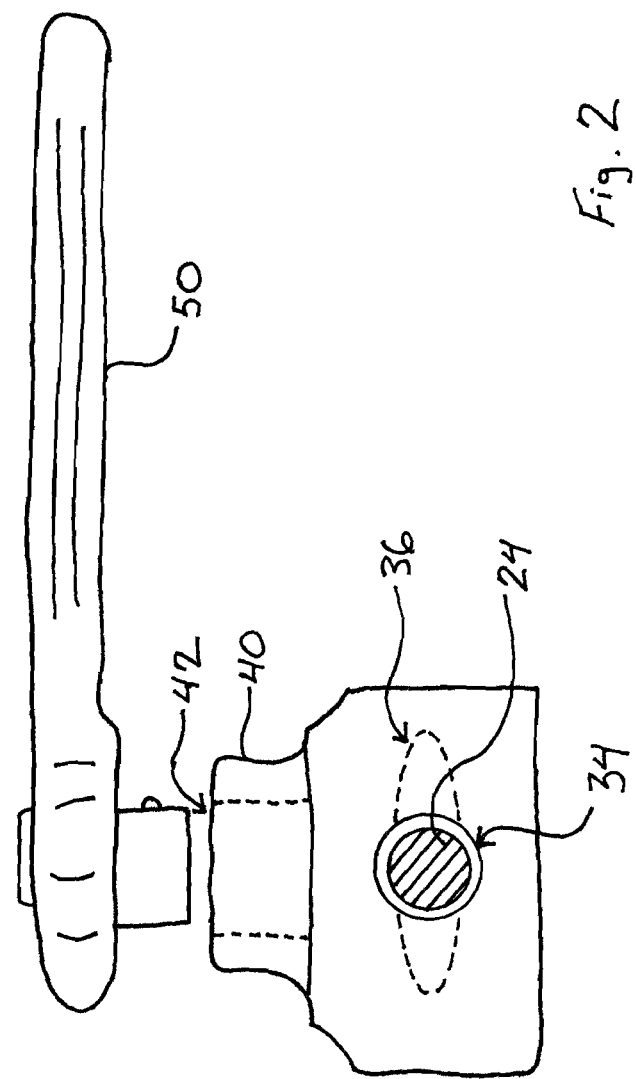
FIG. 2 is a schematic side view of the present invention.
Figure 3:
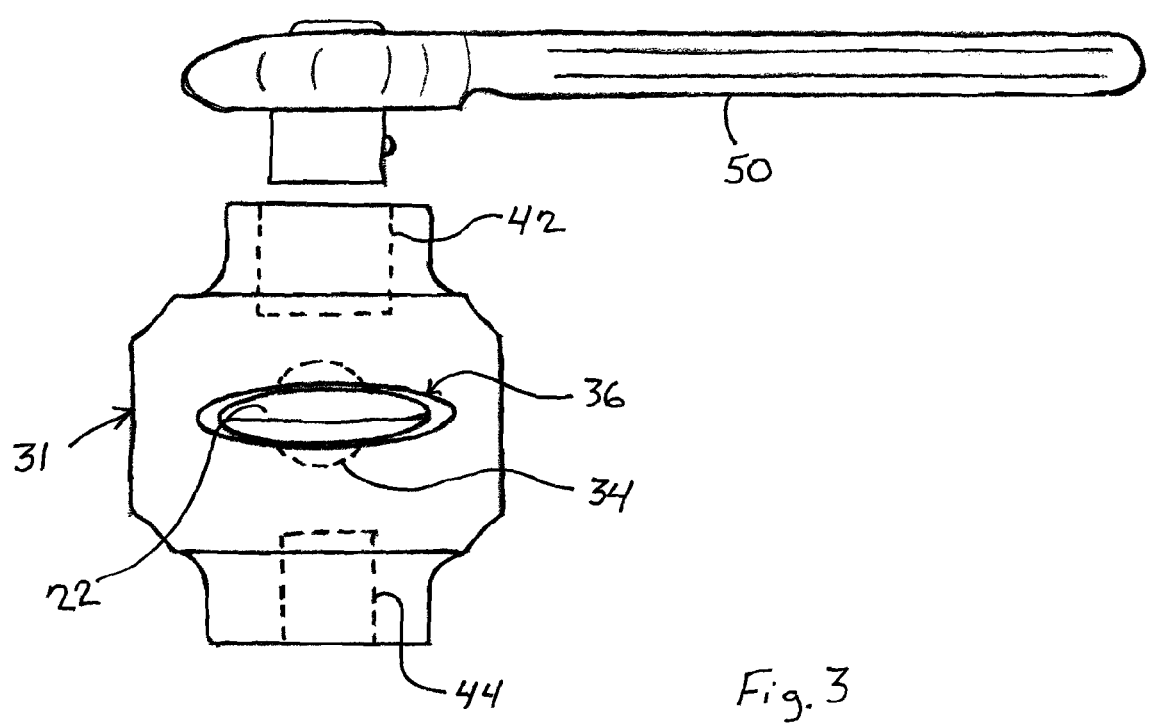
FIG. 3 is a schematic side view of the present invention.

With reference now to the drawings, and in particular to FIGS. 1 through 6 thereof, a new Tire Working Apparatus and Method of Use embodying the principles and concepts of the present invention and generally designated by the reference numeral 10 will be described.

As best illustrated in FIGS. 1 through 6, the Tire Working Apparatus 10 generally comprises a tire iron 20 for selectively working a bead of a tire adjacent to a rim flange of a wheel, and a rotating member 30 selectively receiving the tire iron 20. Preferably, the rotating member 30 has a main cylindrical wall 31 which includes a lateral aperture 32 positioned substantially perpendicular to a longitudinal axis of the rotating member 30. The tire iron 20 may be positioned through the lateral aperture 32. Typically, the tire iron 20 further has a tire working end 22 and a handle portion 24.

In an embodiment the lateral aperture 32 also includes a first bore portion 34 and a second bore portion 36. The first bore portion 34 is positioned at a first end 35 of the lateral aperture 32 and has a first cross-sectional shape. The second bore portion 36 is similarly positioned at a second end 37 of the lateral aperture 32 and has a second cross-sectional shape.

In a further embodiment the first cross-sectional shape is substantially circular, and the second cross-sectional shape is substantially elliptical. Similarly, the tire working end 22 of the tire iron 20 has a flattened portion 26 for engaging the bead and the rim flange of the wheel. The flattened portion 26 has a somewhat elliptical cross-section. The elliptical shapes of the second cross-section and the flattened portion 26 of the tire iron 20 inhibit the tire iron 20 from rotating around a longitudinal axis of the tire iron 20 when at least a portion of the flattened portion 26 of the tire iron engages the second cross section of the rotating member 30.

It is important to note that various other cross-sectional shaped may also be used to inhibit undesired rotation around the longitudinal axis of the tire iron. These include, but certainly are not limited to square, rectangle, triangle, hexagonal, polygonal, star, and the like. The use of these alternate shapes does not depart from the nature of the present invention and fall within the scope of the same.

In a further embodiment the rotating member 30 further comprises a tool coupling portion 40 positioned at a first end 35 of the rotating member 30. Preferably, the tool coupling portion 40 is in the form of a socket 42 for receiving a square drive of a ratchet wrench 50. Typically, the socket 42 is designed for receiving a ¾ inch square drive or a 1 inch square drive.

In an alternate embodiment, the tool coupling portion 40 may be a stud extending outwardly from the first end of the rotating member. The stud is designed to engage a wrench or similar device.

In embodiment the rotating member 30 also comprises a second socket 44 positioned at a second end 37 of the rotating member 30.

In still a further embodiment, the first socket 42 is designed for receiving a ¾ inch square drive and the second socket 44 is designed for receiving a 1 in square drive.

In at least one embodiment of the present invention, a ratchet wrench 50 is included which may be operationally coupled to the tool coupling portion of the rotating member.

In use, the user positions a tire onto the wheel and abuts an inside bead wall of the tire, relative to the front of the wheel, adjacent to the inside rim flange of the wheel. The user then positions the tire iron into the rotating member so that the elliptical cross section of the tire iron engages the elliptical cross-section of the second bore and engages the ratchet wrench into the socket. The user then positions the tire working end of the tire iron under the bead wall and applies force to the ratchet wrench so that the tire iron is urged in a first direction to lift and position the inside bead wall onto the rim against the rim flange. The user will reposition the tire working apparatus and reapplying force to the ratchet wrench until inside wall of the tire has been mounted to the side rim. This process may be repeated the process as required for the outside bead wall and the outside rim of the wheel. It is important to note that these operations may be conducted while the wheel is mounted to the tractor and both the tire and the wheel are in a vertical orientation.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Tire Working Apparatus | |
|---|---|
| 10. | Tire Working Apparatus |
| 11. | |
| 12. | |
| 13. | |
| 14. | |
| 15. | |
| 16. | |
| 17. | |
| 18. | |
| 19. | |
| 20. | Tire Iron |
| 21. | |
| 22. | Tire Working End |
| 23. | |
| 24. | Handle Portion |
| 25. | |
| 26. | Flattened Portion |
| 27. | |
| 28. | |
| 29. | |
| 30. | Rotating Member |
| 31. | Main Wall |
| 32. | Lateral Aperture |
| 33. | |
| 34. | First Bore |
| 35. | First End |
| 36. | Second Bore |
| 37. | Second end |
| 38. | |
| 39. | |
| 40. | Tool Coupling Portion |
| 41. | |
| 42. | Socket |
| 43. | |
| 44. | Second Socket |
| 45. | |
| 46. | |
| 47. | |
| 48. | |
| 49. | |
| 50. | Ratchet Wrench |
| 51. | |
| 52. | |
| 53. | |
| 54. | |
| 55. | |
| 56. | |
| 57. | |
| 58. | |
| 59. | |
| 60. | |
| 61. | |
| 62. | |
| 63. | |
| 64. | |
| 65. | |
| 66. | |
| 67. | |
| 68. | |
| 69. | |
| 70. | |
| 71. | |
| 72. | |
| 73. | |
| 74. | |

| Index of Elements for Tire Working Apparatus |
| --- |
| 75. |
| 76. |
| 77. |
| 78. |
| 79. |

I claim:

1. A tire working apparatus comprising:
a tire iron for selectively working a bead of a tire adjacent to a rim flange of a wheel;
a rotating member selectively receiving said tire iron, said rotating member further comprises a main cylindrical wall, said main cylindrical wall having an lateral aperture positioned substantially perpendicular to a longitudinal axis of said rotating member, said tire iron being positionable through said lateral aperture;
wherein said lateral aperture further comprises:
   a first bore portion positioned at a first end of said lateral aperture, said first bore portion having a first cross-sectional shape;
   a second bore portion positioned at a second end of said lateral aperture, said second bore portion having a second cross-sectional shape;
said first cross-sectional shape being substantially circular, and said second cross-sectional shape being substantially elliptical;
said tire iron further comprises a tire working end and a handle portion, said handle portion having a substantially circular cross-section;
said tire working end has a flattened portion for engaging the bead and the rim flange of the wheel, said flattened portion having a somewhat elliptical cross-section;
said rotating member further comprises a tool coupling portion positioned at a first end of said rotating member; and
said tool coupling portion further comprises a socket for receiving a square drive of a ratchet wrench.

2. The tire working apparatus of claim 1, further comprising said socket being adapted for receiving a 3/4 inch square drive.

3. The tire working apparatus of claim 1, further comprising said socket being adapted for receiving a 1 inch square drive.

4. The tire working apparatus of claim 1, further comprising a ratchet wrench operationally coupleable to said tool coupling portion of said rotating member.

5. A method of working a tire comprising:
providing a tire iron for selectively working a bead of a tire adjacent to a rim flange of a wheel;
providing a rotating member selectively receiving said tire iron, said rotating member further comprises a main cylindrical wall, said main cylindrical wall having an lateral aperture positioned substantially perpendicular to a longitudinal axis of said rotating member, said tire iron being positionable through said lateral aperture;
wherein said lateral aperture further comprises:
a first bore portion positioned at a first end of said lateral aperture, said first bore portion having a first cross-sectional shape;
a second bore portion positioned at a second end of said lateral aperture, said second bore portion having a second cross-sectional shape;
said first cross-sectional shape being substantially circular, and said second cross-sectional shape being substantially elliptical; said tire iron further comprises a tire working end and a handle portion, said handle portion having a substantially circular cross-section;
said tire working end has a flattened portion for engaging the bead and the rim flange of the wheel, said flattened portion having a somewhat elliptical cross-section;
said rotating member further comprises a tool coupling portion positioned at a first end of said rotating member;
said tool coupling portion further comprises a socket for receiving a square drive of a ratchet wrench;
providing a ratchet wrench with a square drive adapted for mating with said socket;
positioning a tire substantially on a wheel;
abutting an inside bead wall of the tire, relative to the front of the wheel, adjacent to the inside rim flange;
positioning said tire iron into said rotating member such that said elliptical cross section of the tire iron engages the elliptical cross-section of the second bore to inhibit rotation of said tire iron around the longitudinal axis of said tire iron;
engaging said ratchet wrench in said socket;
positioning the tire working end of the tire iron under the bead wall;
applying force to said ratchet wrench such that said tire iron is urged in a first direction to lift and position said inside bead wall onto the rim against the rim flange;
repositioning the tire working apparatus and reapplying force to said ratchet wrench until inside wall of the tire has been mounted to the side rim; and
repeating the process as required for the outside bead wall and the outside rim of the wheel.

* * * * *